W. L. PEELER.
FOUNTAIN BRUSH.
APPLICATION FILED DEC. 2, 1910.
1,000,937.
Patented Aug. 15, 1911.
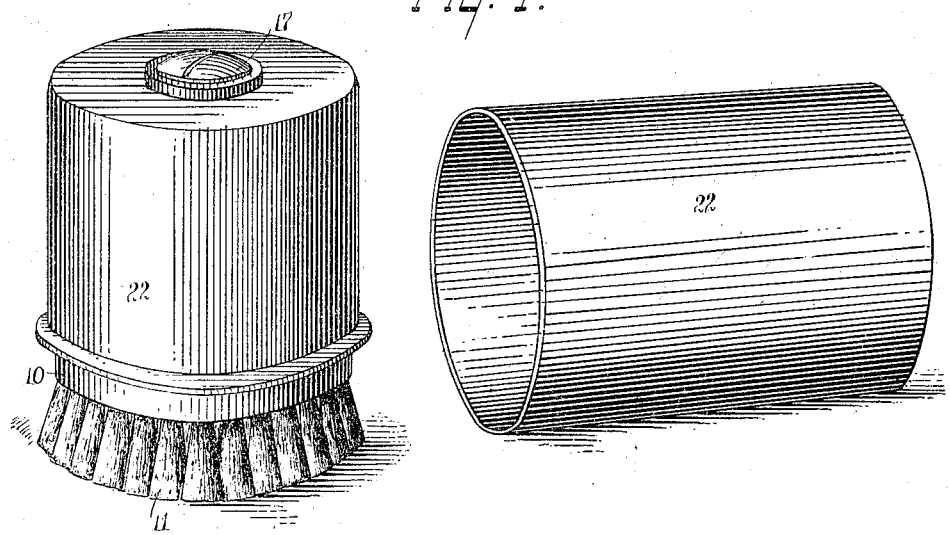
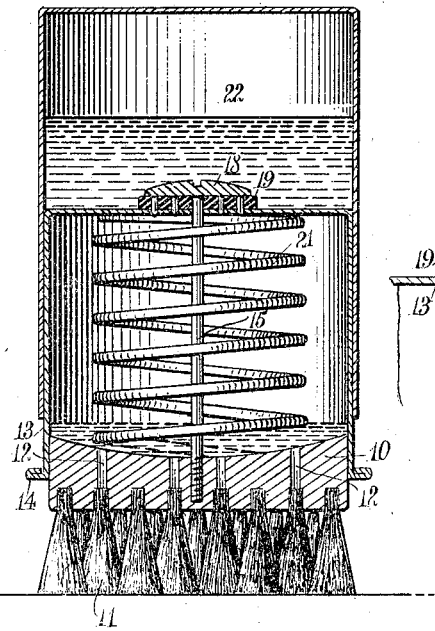
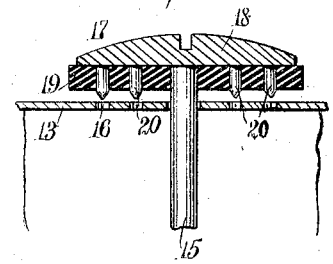
WITNESSES
INVENTOR
William L. Peeler
BY
ATTORNEYS

UNITED STATES PATENT OFFICE.

WILLIAM L. PEELER, OF GREENVILLE, TEXAS.

FOUNTAIN-BRUSH.

1,000,937.

Specification of Letters Patent. Patented Aug. 15, 1911.

Application filed December 2, 1910. Serial No. 595,224.

*To all whom it may concern:*

Be it known that I, WILLIAM L. PEELER, a citizen of the United States, and a resident of Greenville, in the county of Hunt and State of Texas, have invented a new and Improved Fountain-Brush, of which the following is a full, clear, and exact description.

The invention relates to fountain brushes and has for an object to provide a brush adapted for cleaning goods and applying liquids or semi-liquids thereto.

For the purpose mentioned use is made of an apertured brush body provided with bristles, an apertured casing mounted to slide on the said body, a valve adapted to normally close the apertures in the casing, a spring in the said casing and adapted to engage the said valve with the said casing and a second casing adapted to constitute a cover for the brush body and a reservoir for a liquid or a holder for the fountain brush liquescent substance.

Reference is to be had to the accompanying drawings, constituting a part of this specification in which similar characters of reference denote corresponding parts in all the views and in which—

Figure 1 is a perspective view of my device showing the same; with the cover thereof removed; Fig. 2 is a longitudinal sectional view with the cover adapted as a holder; and Fig. 3 is an enlarged fragmentary sectional view of the valve and valve rod.

Referring more particularly to the views, I employ a brush body 10 having bristles 11 thereon and ducts 12 extending through the body 10 to the said bristles 11. Slidably mounted on the body 10 is a casing 13 and a peripherally-extending stop flange 14 is integrally formed on the said casing. A valve rod 15 is secured to the body 10 and slidably extends through the casing 13. In the upper end of the casing, a plurality of apertures 16 are formed, and secured to the rod 15 is a valve 17 consisting of a removable valve screw 18, a packing disk 19 and a plurality of valve heads 20 adapted to register with the apertures 16. A coiled spring 21 is disposed to encircle the rod 15 in the casing 13 and normally holds the valve 17 in engagement with the casing 13. A second casing 22 constituting a reservoir for a liquid or liquescent substance, is adapted to engage the flange 14 of the casing 13 and forms a cover for the brush body 10 when my device is not in use, and the said casing 22 is also adapted to constitute a holder for the fountain brush when the same is in operation, as will be easily seen in Fig. 2.

In the use of my device, the casing 22 is removed from the casing 13 and a liquid is conveniently poured into the casing 22. When the casing has been sufficiently filled with the liquid it is replaced on the casing 13 as shown in Fig. 2. When using the device as a brush, a slight downward pressure on the casing will disengage the valve 17 from the casing 13 and as air enters the casing through the apertures 16 the liquid will flow through the apertures in the casing and onto the bristles 11 from which it will be conveyed to the goods to be cleaned or polished. When the downward pressure is removed from the casing 13, the action of the spring 21 will move the casing to be reengaged by the valve 17 and the flow of liquid through the apertures 16 ceases. The valve heads 20 aside from constituting a portion of the valve are employed to position the valve 17 substantially over the apertures 16 and register with the apertures when my device is in normal position.

My device can be conveniently employed as a shoe polishing brush or a mucilage brush and is particularly adapted for use in cleaning cloth goods and the like with a suitable cleaning liquid such as gasolene, contained in the casing 22. When not in use the cover 22 is removed from the casing 13, the liquid is poured therefrom and the cover is then placed over the brush body 11 to protect the same, while in use the cover 22 constitutes a holder for the fountain brush by securing the cover to the casing 13 as shown in Fig. 2 and at the same time the cover 22 acts as a reservoir for the liquid or liquescent substance to be used for cleaning purposes.

Having thus described my invention, what I claim as new and desire to secure by Letters Patent is:—

1. A device of the class described comprising a brush body provided with bristles, ducts formed in the said body and extending to the said bristles, a casing mounted to slide on the said body, a rod having one end thereof secured to the said body and the other end thereof extending through the said casing, a valve removably secured to the said rod, a plurality of valve heads formed on the valve and adapted to register with and extend into apertures in the said casing, a coiled spring encircling the said rod in the said casing and a second casing, constituting a reservoir, and for attachment to the first casing.

2. A device of the class described comprising a brush body, a casing mounted to slide on the said body, a rod having one end thereof secured to the said body and the other end thereof slidably extended through the said casing, a valve removably secured to the said rod and adapted to engage the said casing, a spring encircling the said rod in the casing, a peripherally extending stop flange integrally formed on the said casing and a second casing adapted to engage the stop flange to form a cover for the said body and constituting a reservoir for the device described when the same is in operation.

In testimony whereof I have signed this specification in the presence of two subscribing witnesses.

WILLIAM L. PEELER.

Witnesses:
ANNIE LONG,
C. G. LONG.